United States Patent
O'Connor et al.

(10) Patent No.: US 9,871,835 B2
(45) Date of Patent: Jan. 16, 2018

(54) SYSTEM AND METHOD FOR MANAGING MULTI-MODAL COMMUNICATION SESSIONS

(71) Applicant: Avaya Inc., Santa Clara, CA (US)

(72) Inventors: Neil O'Connor, Galway (IE); Joel M. Ezell, Broomfield, CO (US); Seamus Hayes, Co. Longford (IE)

(73) Assignee: Avaya Inc., Basking Ridge, NJ (US)

( * ) Notice: Subject to any disclaimer, the term of this patent is extended or adjusted under 35 U.S.C. 154(b) by 215 days.

(21) Appl. No.: 14/752,857

(22) Filed: Jun. 27, 2015

(65) Prior Publication Data

US 2016/0381091 A1    Dec. 29, 2016

(51) Int. Cl.
*H04L 29/06*    (2006.01)

(52) U.S. Cl.
CPC .................. *H04L 65/403* (2013.01)

(58) Field of Classification Search
CPC .......... H04L 12/1813; H04L 29/06414; H04M 2203/2088; H04M 3/56; H04M 3/561; H04M 3/567
USPC ........................................... 370/260
See application file for complete search history.

(56) References Cited

U.S. PATENT DOCUMENTS

| | | | | |
|---|---|---|---|---|
| 8,468,451 B1* | 6/2013 | Rauba | ...................... | G06F 3/048 715/705 |
| 9,148,512 B1* | 9/2015 | Kumar | ................. | H04M 3/5232 |
| 9,313,332 B1* | 4/2016 | Kumar | ................. | H04M 3/5232 |
| 2003/0140113 A1* | 7/2003 | Balasuriya | ........ | G06F 17/30899 709/217 |
| 2008/0147406 A1* | 6/2008 | Da Palma | ............... | G10L 15/22 704/260 |
| 2008/0147407 A1* | 6/2008 | Da Palma | ............... | G10L 15/22 704/260 |
| 2010/0246800 A1* | 9/2010 | Geppert | ............. | G06F 3/04817 379/265.09 |
| 2013/0039483 A1* | 2/2013 | Wolfeld | .................. | H04M 3/00 379/265.03 |
| 2013/0094647 A1* | 4/2013 | Mauro | ................ | H04M 3/5141 379/265.09 |
| 2014/0136208 A1* | 5/2014 | Maltseff | ................ | G10L 13/033 704/260 |
| 2014/0219437 A1* | 8/2014 | Kannan | ............... | H04M 3/5175 379/265.03 |

(Continued)

*Primary Examiner* — Robert Lopata

(57) ABSTRACT

A computing system for managing a multi-modal communication session in an enterprise is disclosed. The computing system includes a monitoring module for monitoring activities associated with the multi-modal communication session between a customer and an agent, wherein the customer and the agent communicate over a first communication modality. The system further includes an analysis module for analyzing the activities to initiate communication between the customer and the agent over a second communication modality within the multi-modal communication session, wherein the communication over the second communication modality operates along with the communication over the first communication modality. The system further includes a notification module for generating notifications for notifying information associated with the first communication modality, the second communication modality, or a combination thereof to a supervisor.

20 Claims, 6 Drawing Sheets

(56) References Cited

U.S. PATENT DOCUMENTS

| | | | |
|---|---|---|---|
| 2015/0148011 A1* | 5/2015 | Chen | H04L 51/04 |
| | | | 455/412.2 |
| 2015/0195310 A1* | 7/2015 | Jaiswal | H04L 65/1083 |
| | | | 709/223 |
| 2015/0350258 A1* | 12/2015 | Griffin | H04L 65/1093 |
| | | | 348/14.08 |
| 2016/0234319 A1* | 8/2016 | Griffin | H04L 67/322 |
| 2017/0149966 A1* | 5/2017 | Anderson | H04M 3/42221 |

* cited by examiner

SYSTEM AND METHOD FOR MANAGING MULTI-MODAL COMMUNICATION SESSIONS

BACKGROUND

Field

Embodiments of the present invention generally relate to a system and method to manage communication sessions in an enterprise and particularly to a system and method for managing multi-modal communication sessions in an enterprise.

Description of Related Art

Contact centers are employed by many enterprises to service, inbound and outbound contacts or customers. A primary objective of contact center management is to ultimately maximize contact center performance and profitability. An ongoing challenge in contact center administration is monitoring and optimizing contact center efficiency usage of its available resources. The contact center efficiency is generally measured by metrics such as Service Level Agreement ('SLA'), Customer Satisfaction ('CSAT'), and match rate. Contact center resources may include, agents, communication assets (e.g., number of voice trunks, number and bandwidth of video trunks, etc.), computing resources (e.g., a speed, a queue length, a storage space, etc.), and so forth.

Service level is one measurement of the contact center efficiency. Service level is typically determined by dividing the number of contacts accepted within a specified period by the number accepted plus number that were not accepted, but completed in some other way (e.g., abandoned, given busy, canceled, flowed out). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent in a queue over the same period. An agent with a primary skill level is one who typically may handle contacts of a certain nature more effectively and/or efficiently as compared to an agent of lesser skill level. There are other contact center agents who may not be as proficient as the primary skill level agent, and those agents are identified either as skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ('KPIs'), such as revenue, estimated, actual, or predicted wait time, average speed of answer, throughput, resource utilization, resource performance, resource responsiveness and the like, to calculate performance relative to their Service Level Agreements ('SLAs'). Operational efficiency is achieved when the KPIs are managed near, but not above, SLA threshold levels.

Throughput is a measure of the number of contacts/contact requests or communication sessions that may be processed in a given amount of time. Resource utilization is a measure of how efficiently the resources' time is being used. Customer service level is a measure of the time customers spend waiting for their work to be handled. Company contact center customers wish to provide service to as many requests as possible in a given amount of time, using the least number of resources to do so, and minimizing the wait time for their customers.

Typically, when a new contact arrives into a contact center, a most suitable agent to provide services is selected by the contact center. However, all agents are not at same level within the contact center. Some of the agents of the contact center are very skilled agents, also called as gold rated agents, but some of the agents are not very skilled, but having some minimum skills, also called silver rated agents. Hence, it is necessary to monitor communication sessions managed by agents, such as silver rated agents in order to maintain the business goals. These communication sessions are monitored by supervisors of the contact center. The supervisor is allowed to listen to a conversation between a customer and an agent on an Automatic Call Distribution (ACD), monitor textual conversation going back and forth on a web chat session, or pre-approve an agent's response emails before communicating to customers, to name a few examples. However, most of the communication sessions are multi-modal communication sessions.

Multi-modal communication sessions are communication sessions in which customers and agents are already in communicating with each other, for example, a voice communication session, a video communication session, a web chat communication sessions, etc., and the customer and agent further desire to add a new communication within the communication session. For example, an agent is on a web chat with a customer, and a cellphone voice communication is added. Then a co-browse communication, and then a WebRTC communication is added along with the initial web chat session between the customer and the agent.

Traditional monitoring techniques are modality centric, for example, how a particular modality is managed by an agent, and therefore, the efficient monitoring of different communication modalities added to a communication session becomes difficult. Further, the supervisor can monitor only an initial communication associated with a communication session and when another communication is added within the communication session then the supervisor has to manually figure out which communication is associated with the communication session, which is a time consuming and cumbersome process.

There is thus a need for a system and method for managing multi-modal communication sessions in an enterprise in a more efficient manner.

SUMMARY

Embodiments in accordance with the present invention provide a computing system for managing a multi-modal communication session in an enterprise. The computing system includes a monitoring module for monitoring one or more activities associated with the multi-modal communication session between a customer and an agent, wherein the customer and the agent communicate over a first communication modality. The system further includes an analysis module for analyzing the one or more activities to initiate communication between the customer and the agent over a second communication modality within the multi-modal communication session, wherein the communication over the second communication modality operates along with the communication over the first communication modality. The system further includes a notification module for generating one or more notifications for notifying information associated with the first communication modality, the second communication modality, or a combination thereof to a supervisor.

Embodiments in accordance with the present invention further provide a computer-implemented method for managing one or more communication sessions in an enterprise. The method includes monitoring one or more activities associated with the multi-modal communication session between a customer and an agent, wherein the customer and the agent communicate over a first communication modality; analyzing the one or more activities to initiate communication between the customer and the agent over a second communication modality within the multi-modal communication session, wherein the communication over the second communication modality operates along with the communication over the first communication modality; and generating one or more notifications for notifying information associated with the first communication modality, the second communication modality, or a combination thereof to a supervisor.

Embodiments in accordance with the present invention further provide a computer-implemented method for managing one or more communication sessions in an enterprise. The method includes monitoring one or more activities associated with the multi-modal communication session between a customer and an agent, wherein the customer and the agent communicate over a first communication modality; storing the one or more activities in at least one database; analyzing the one or more activities to initiate communication between the customer and the agent over a second communication modality within the multi-modal communication session, wherein the communication over the second communication modality operates along with the communication over the first communication modality; generating one or more notifications for notifying information associated with the first communication modality, the second communication modality, or a combination thereof to a supervisor; receiving a request from the supervisor to join the multi-modal communication session; and enabling the supervisor to join the multi-modal communication session.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
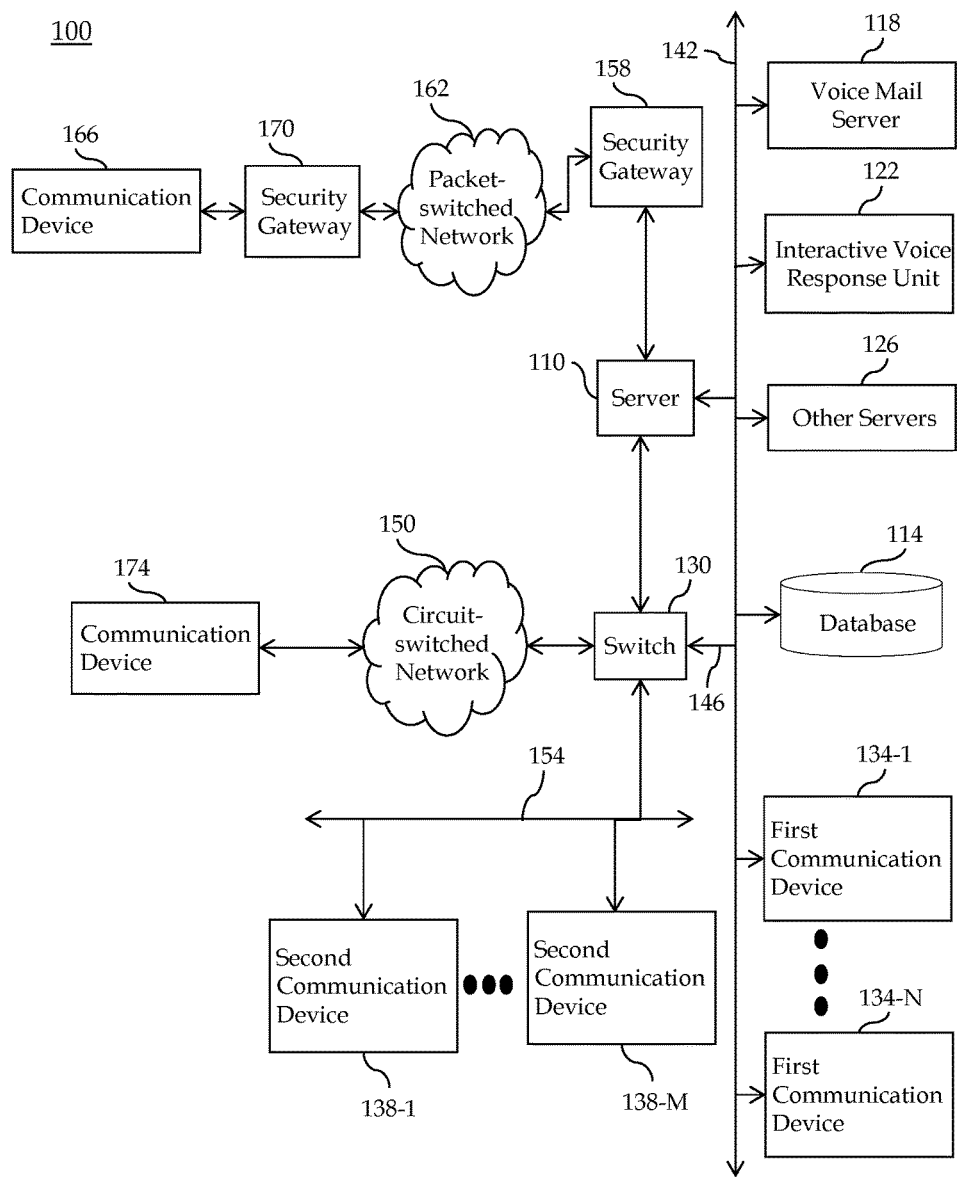
FIG. 1A illustrates a block diagram depicting a contact center, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-transient, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

The terms "customer" and "contact" may be used interchangeably in certain context of this disclosure of the present invention when referring to one or more persons/entity contacting a contact center, usually to reach an IVR system and/or one or more agents for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

The term "resource" may be used interchangeably in certain context with "agent" within this disclosure of the present invention when referring to one or more persons/entity servicing a contact in a contact center or a knowledge resource within an enterprise servicing back office transactions. In an embodiment of the present invention, the resource may be, but is not restricted to, an agent, an available agent, a reserve agent, a trainee agent, a Subject Matter Expert (SME), a supervisor, and so forth.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1A shows an illustrative embodiment of the present invention. A contact center 100 comprises a server 110, a set of data stores or databases 114, such as, a resource database, or a customer database, containing agent contact or customer related information, resource related information, communication sessions related information, and other information that may enhance the value and efficiency of the contact processing, and a plurality of servers, namely a voice mail server 118, an Interactive Voice Response unit (e.g., IVR) 122, and other servers 126, a switch 130, a plurality of working resources operating packet-switched (first) communication devices 134-1-N (such as computer work stations, or personal computers), and/or circuit-switched (second) communication devices 138-1-M, all interconnected by a Local Area Network (LAN) 142, (or Wide Area Network (WAN)). In another embodiment of the present invention, the customer and resource related information may be replicated over multiple repositories.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown), or as a chip in the server 110.

The switch 130 and/or server 110 may be any architecture for directing incoming communication sessions to one or more communication devices associated with the resources of the contact center 100. In some embodiments of the present invention, the switch 130 may perform load-balancing functions by allocating incoming or outgoing communication sessions among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya, or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that embodiments of the present invention do not require any particular type of information transport medium between switch, or server and first and second communication devices, i.e., embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), Internet Message Access Protocol Version 4 (IMAP4), Integrated Services Digital Network (ISDN), E1/T1, and analog line or trunk.

It should be emphasized the configuration of the switch 130, the server 110, customer communication devices, and other elements as shown in FIG. 1A is for purposes of illustration only and should not be construed as limiting embodiments of the present invention to any particular arrangement of elements.

Further, the server 110 is notified via the LAN 142 of an incoming contact or work item by the communications component (e.g., switch 130, a fax server, an email server, a web server, and/or other servers) receiving the incoming contact as shown in FIG. 1A. The incoming contact is held by the receiving telecommunications component until the server 110 forwards instructions to the component to forward or route the contact to a specific contact center resource, such as the IVR unit 122, the voice mail server 118, and/or the first or second communication device 134-1-N, 138-1-M associated with a resource.

Figure 1B:
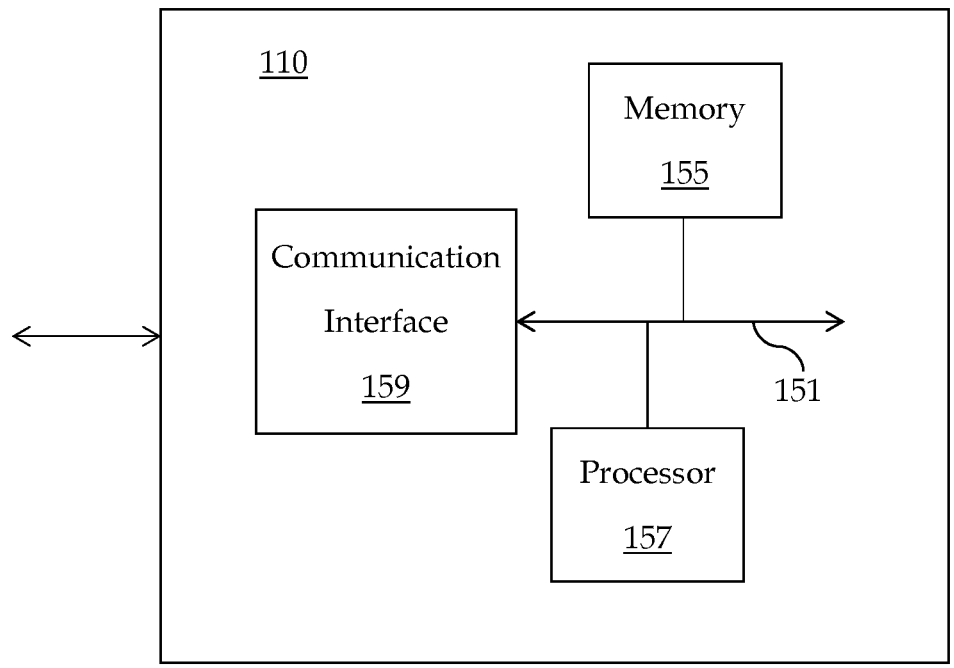
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood the principles of embodiments of the present invention may apply to other network architectures. For example, embodiments of the present invention may apply to peer-to-peer networks, such as those envisioned by the Session Initiation Protocol (SIP). In the client-server model or paradigm, network services and the programs used by end customers to access the services are described. The client side provides a customer with an interface for requesting services from the network, and the server side is responsible for accepting customer requests for services and providing the services transparent to the customer. By contrast in the peer-to-peer model or paradigm, each networked host runs both the client and server parts of an application program. Additionally, embodiments of the present invention do not require the presence of packet- or circuit-switched networks.

Figure 2:
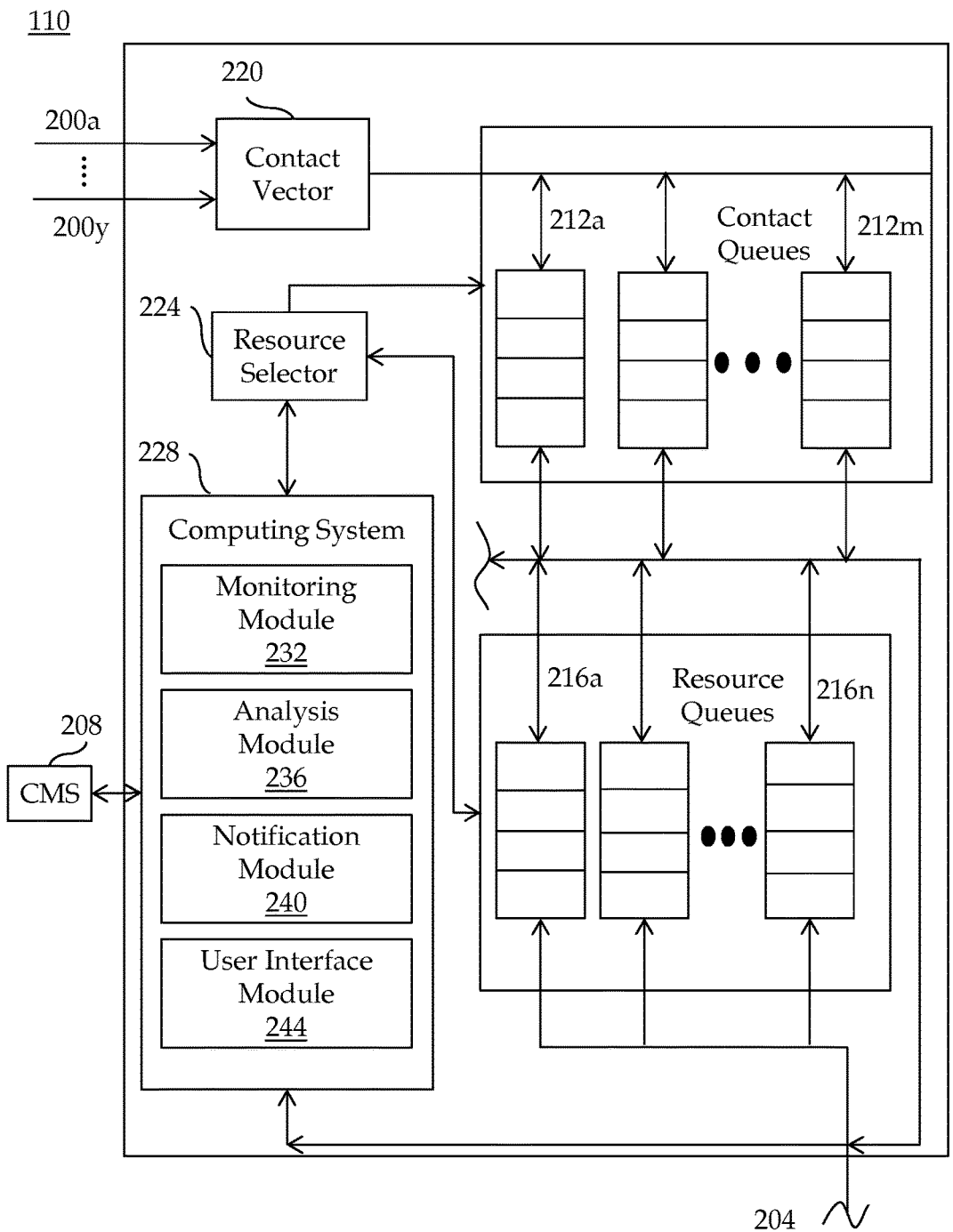
FIG. 2 illustrates a functional block diagram of the server that may be used in the contact center, according to an embodiment of the present invention.

Referring to FIG. 2, one possible configuration of the server 110 is depicted at a relatively high level of functional abstraction, according to an embodiment of the present invention. The server 110 is in communication with a plurality of contact or customer communication lines 200a-y (which may be one or more trunks, phone lines, etc.) and a resource communication line 204 (which may be a voice-and-data transmission line such as the LAN 142 and/or a circuit switched voice line). The server 110 may include, but not restricted to, Avaya Inc.'s Operational Analyst™ (OA) with On-Line Analytical Processing (OLAP) technology, or a Call Management System (CMS) 208 that gathers contact records. OA and CMS will hereinafter be referred to jointly as CMS 208.

As shown in FIG. 2, a set of contact queues 212a-m and a separate set of resource queues 216a-n are among the data stored in the server 110. Each contact queue 212a-m corresponds to a different set of resource queues, as does each resource queue 216a-n. Conventionally, contacts are prioritized and either are queued in individual ones of the contact queues 212a-m in their order of priority or are queued in different ones of a plurality of contact queues 212a-m that correspond to a different priority. Likewise, each resource's queues are prioritized according to his or her level of expertise or skill in that queue, and resources are queued in either individual ones of resource queues 216a-n in their order of expertise level, or in different ones of a plurality of resource queues 216a-n that correspond to a queue and each one of which corresponds to a different expertise level.

According to an embodiment of the present invention, included among the control programs in the server 110 is a contact vector 220. Communication sessions associated with contacts incoming to the contact center 100 are assigned by the contact vector 220 to different contact queues 212a-m based upon a number of predetermined criteria, including a customer's identity, customer needs, contact center needs, current contact center queue lengths, a customer value, and an agent skill that is required for proper handling of the communication session. Resources available for handling contacts are assigned to the resource queues 216a-n based upon the skills that they possess. A resource may have multiple skills, and hence may be assigned to multiple resource queues 216a-n simultaneously. Furthermore, a resource may have different levels of skill expertise (e.g., skill levels 1-N in one configuration or merely primary skill levels and secondary skill levels in another configuration), and hence may be assigned to different resource queues 216a-n at different expertise levels.

In one configuration, the contact center 100 is operated by a contract operator (e.g., a supervisor, or a manager of the contact center 100), and each of the contact queues 212a-m, and possibly each of the resource queues 216a-n, corresponds to a different client, such as but not limited to, a customer. Each client may have a separate Service Level Agreement ('SLA') or other type of performance measurement agreement with the contract operator regarding performance expectations, goals, requirements or specifications for the contact's respective queue(s).

Further, embodiments in accordance with the present invention may include, among the programs executing on the server 110, a resource selector 224 and a computing system 228. The resource selector 224 and the computing system 228 are stored either in a main memory, or in a peripheral memory (e.g., disk, CD ROM, etc.) or some other computer-readable medium of the contact center 100. Further, the resource selector 224 monitors the occupants of the contact and resource queues 212*a-m* and 216*a-n*, respectively, and contact center objectives, rules, and policies and select resources to service contacts.

The resource selector 224 distributes and connects these contacts to communication devices of available resources based on the predetermined criteria noted above. When the resource selector 224 forwards a contact (or first communication session) to a resource, the resource selector 224 also forwards customer-related information from the database 114 to the resource's work station (e.g., a desktop or a computer, a laptop, a smartphone, or any other type of communication device) for previewing and/or viewing (such as by a pop-up display) to enable the resource for providing better services to the customer. Depending on the contact center configuration, the resource selector 224 may reallocate the contact to the resources of the contact center 100. The resources process the contacts or communication sessions sent to them by the resource selector 224.

In an embodiment of the present invention, the resources and their associated data are maintained and updated in the database 114 of the contact center 100. Upon the completion of handling a contact, a generator (not shown) collects selected metrics for the contact. These metrics may include skills involved in servicing the contact, an identifier of a servicing resource, contact duration, a transaction or contact type (e.g., sale, information request, complaint, etc.), time-of-day, result of the contact (e.g., type of sale, number of units sold, an average revenue generated, etc.), and so forth. The metrics along with other statistics is typically gathered by the CMS 208.

According to an embodiment of the present invention, the computing system 228 includes certain modules, such as, but not restricted to, a monitoring module 232, an analysis module 236, a notification module 240, and a user interface module 244. In some embodiments, one or more of the monitoring module 232, the analysis module 236, the notification module 240, and the user interface module 244 may be implemented by one or more software processes running on the server 110. The server 110 may implement one or more software processes by use of the processor 157 being suitably programmed by use of software instructions stored in the memory 155 coupled to the processor 157.

The monitoring module 232 monitors a communication session between a customer and an agent of the contact center 100. The communication session between the customer and an agent may be a multi-modal communication session, in an embodiment of the present invention. The communication session may be initiated by the customer, or by the agent of the contact center 100. The communication between the customer and the agent may be initiated over different types of communication modalities, in an embodiment of the present invention. In an exemplary scenario, the communication between the customer and the agent may be over a first communication modality of the communication session. The monitoring module 232 may monitor the first communication modality of the communication session between the agent and the customer. The communication modalities may include, but not restricted to, voice communication modalities, video communication modalities, textual communication modalities, for example, a Short Message Service (SMS) communication modality, a web chat communication modality, an Instant Messaging (IM) communication modalities, or an email communication modality, Interactive Voice Response (IVR) communication modalities, Voice over Internet Protocol (VoIP) communication modalities, Web Real Time Communication (WebRTC) communication modalities, and so forth.

The monitoring module 232 monitors the communication between the customer and the agent over the first communication modality of the communication session to determine context of the communication session. In an embodiment of the present invention, the context of the communication session is determined by monitoring inputs selected by the customer in an IVR menu of the contact center 100. The context of the communication session may include, but not restricted to, a product inquiry support, a sales support, a life, or car policy support, a financial transaction support, and so forth. In an exemplary scenario, a customer may provide inputs in an IVR menu of the contact center 100 for an 'car insurance policy', then it is determined that context of the communication session is a product inquiry support for a car insurance policy. In another embodiment of the present invention, the context of the communication session may be monitored by extracting keywords from the communication between the customer and the agent. In an exemplary scenario, a customer may inquire about 'mobile device repair' then 'mobile device', and 'repair' are extracted as keywords from the monitored communication between the customer and the agent.

The monitoring module 232 may monitor activities associated with the communication session between the customer and the agent of the contact center 100, in an embodiment of the present invention. The activities may include, but are not restricted to, ringing of the agent's telephone, pressing a button to answer a communication, display of a web chat window, accepting a request to initiate a web chat, and the like. The monitoring module 232 may monitor the activities to determine whether the customer desires to communicate with the agent over a second communication modality within the communication session. In an exemplary scenario, the customer and the agent may be communicating over a telephone call, and the customer may also want to co-browse with the agent. Therefore, the communication session may include communication over a first communication modality along with the second communication modality. A person skilled in the art will appreciate that multiple modalities are possible for the same communication session.

The monitoring module 232 further monitors details of the customer associated with the communication session, according to an embodiment of the present invention. The details of the customer may include, but not restricted to, personal data (e.g., a name, a social networking username, etc.), contact data (e.g., a telephone number, an email address, etc.), a type of customer priority (e.g., high priority customer, a medium priority customer, a low priority customer), educational background, business contacts, education and work histories, likes, hobbies, favorite sport teams, frequency of conversations with a resource, a history of queries, a customer identification, communication history with the contact center 100, and so forth. In an exemplary scenario, a customer having higher revenue products and/or services provided by the contact center 100 may be referred to as a high priority customer. A customer having medium revenue products and/or services provided by the contact center 100 may be referred to as a medium priority customer.

Further, a customer having low revenue products and/or services provided by the contact center 100, or is a potential customer of the contact center 100 may be referred to as a low priority customer. In an exemplary scenario, the monitoring module 232 may extract the details of the customer from various social networking websites, contact center's database 114, or a combination thereof.

The monitoring module 232 further monitors details of the agent associated with the communication session, according to an embodiment of the present invention. The details of the agent may include, but not restricted to, a name, a designation, a phone number, an extension number, resource identification (ID), social networking usernames, subscription criteria, likes, dislikes, hobbies, work history, education history, age, performance, cultural background, skill set, technical training or experience in supporting a particular industry, company, or customer, and so forth. As used herein, the term 'skill set' refers to a set of agent data that may be used by the contact center 100 to characterize an agent. Such agent data may include, but not restricted to, biographical agent data, demographic agent data, external or internal behavioral agent data, and the like. The behavioral agent data may include the agent's history with respect to the contact center 100 and/or any other entity or social media channel. However, the agent data is not limited in this regard and may include any other type of agent data used by the contact center 100 to characterize or classify the agents of the contact center 100. Further, a profile of the agent may include any other agent data collected from one or more sources external to the contact center 100. Additionally, the profile having the details of the agent may be raw agent data or processed agent data. That is, the agent data may be analyzed to characterize the resource and thereafter used to provide customized or personalized services to the customer. For example, an agent profile may be a set of values associated with an agent and a set of characteristics, where the values may be selected based on the agent data obtained. However, the present application is not limited in this regard and any other methods for evaluating agent data to provide services may be used without limitation. In another embodiment of the present invention, the monitoring module 232 may monitor details of a supervisor monitoring the communication between the customer and the agent of the contact center 100. The details of the supervisor may include, but not restricted to, a name, a designation, a phone number, an extension number, supervisor identification (ID), and the like.

The monitoring module 232 monitors the communication between the customer and the agent associated with the communication session in a real-time environment, in an embodiment of the present invention.

The analysis module 236 may analyze the communication between the customer and the agent over different communication modalities of the communication session, in an embodiment of the present invention. Also, the analysis module 236 may analyze the activities associated with the communication between the customer and the agent of the contact center 100, in an embodiment of the present invention. The analysis module 236 may analyze the activities to initiate another communication between the customer and the agent over a second communication modality within the multi-modal communication session.

The analysis module 236 generates communication identification (ID) for the communication session, in an embodiment of the present invention. For example, a communication ID 'ABC123' is generated for a communication session when a communication session is initiated between a customer and an agent of the contact center 100. Further, the analysis module 236 may generate communication identification (ID) for each of the communication modalities of the communication session, in an embodiment of the present invention. In an exemplary scenario, a communication ID 'AB12' is generated for the first communication modality and a communication ID 'AC13' is generated for the second communication modality of the communication session. One of the objectives to generate the communication ID for the communication session and the communication modalities is to aggregate communication modalities associated with a same multi-modal communication session. In an embodiment of the present invention, a first communication ID may be generated for the first communication modality, a second communication ID may be generated for the second communication modality, and a third communication ID may be generated for a communication session to correlate the first communication modality with the second communication modality associated with the communication session. In another embodiment, a first communication ID may be generated for the first communication modality, and a second communication ID may be generated for the second communication modality.

The analysis module 236 aggregates the communication modalities of the multi-modal communication session based on the generated communication IDs, in an embodiment of the present invention. The analysis module 236 may aggregate the communication modalities of the multi-modal communication session based on a customer ID, in another embodiment of the present invention. In an exemplary scenario, when a customer logs in to a website by using a customer ID and a password, details of the customer are retrieved. When the customer communicates with an agent over a web chat and simultaneously initiates an inbound call to communicate with the agent over a voice call then based on a contact number associated with the customer ID, it is determined that the voice call is associated with the same customer. In yet another embodiment of the present invention, the analysis module 236 may aggregate the communication modalities of the multi-modal communication session by identifying that all the communication modalities are originated from a same customer device. For example, the customer is using same Internet Protocol address (IP address) for a web chat and for a voice call at a same time.

The notification module 240 generates notifications for the supervisor monitoring the communication session between the customer and the agent, in an embodiment of the present invention. The notifications may be generated for notifying information associated with the first communication modality and/or the second communication modality to the supervisor, in an embodiment of the present invention. The information may include, but not restricted to, a type of communication modality over which the communication is taking place, a change in communication modality between the customer and the agent, a status of the communication session, a script provided to the agent to manage the communication session, and the like. The notification module 240 may generate notifications in real time, in an embodiment of the present invention.

The notification module 240 presents the notification to the supervisor, in an embodiment of the present invention. The notification module 240 may present the notification as, but not restricted to, an SMS, a web chat, an Instant Messaging (IM), an audio notification, a video notification, an email, and the like, in an embodiment of the present invention. Further, the notification module 240 customizes the generated notification based on characteristics of a device used by the supervisor, in an embodiment of the present invention. The characteristic may include, but not restricted to, bandwidth. In an exemplary scenario, if the supervisor is using a limited bandwidth device then a stream of video calls and/or voice calls associated with the communication between the customer and the agent is not provided to the supervisor, however, only textual communications may be streamed to the supervisor's device. The notification module 240 may generate a plurality of notifications for the supervisor monitoring a plurality of multi-modal communication sessions simultaneously, in an embodiment.

The user interface module 244 receives a request from the supervisor to join the multi-modal communication session, in an embodiment of the present invention. The request to join the multi-modal communication session is initiated by pressing a 'join' button on a GUI of the supervisor's device, in an exemplary scenario. The user interface module 244 enables the supervisor to join the multi-modal communication session, in an embodiment of the present invention. The supervisor may join the communication session may include that the supervisor may listen to the ongoing communication between the customer and the agent, in an exemplary scenario. The supervisor of the contact center 100 may also barge-in the multi-modal communication session, when the communication session is not going well, in an exemplary scenario. The user interface module 244 may enable the supervisor to join the multi-modal communication session based on, but not restricted to, the bandwidth of the communication over the first communication modality, bandwidth of the second communication over the second communication modality, other characteristics of the device, or a combination thereof. The user interface module 244 may also provide additional information associated with the multi-modal communication session to the agent and the supervisor. For example, real time hints provided to the agent are also provided to the supervisor to monitor whether the agent is responding correctly to the hints being given. In an exemplary scenario, if it is determined that the customer is becoming frustrated and guidance on how to handle the customer, which is provided to the agent, is also provided to the supervisor to monitor the communication between the customer and the agent.

Figure 3:
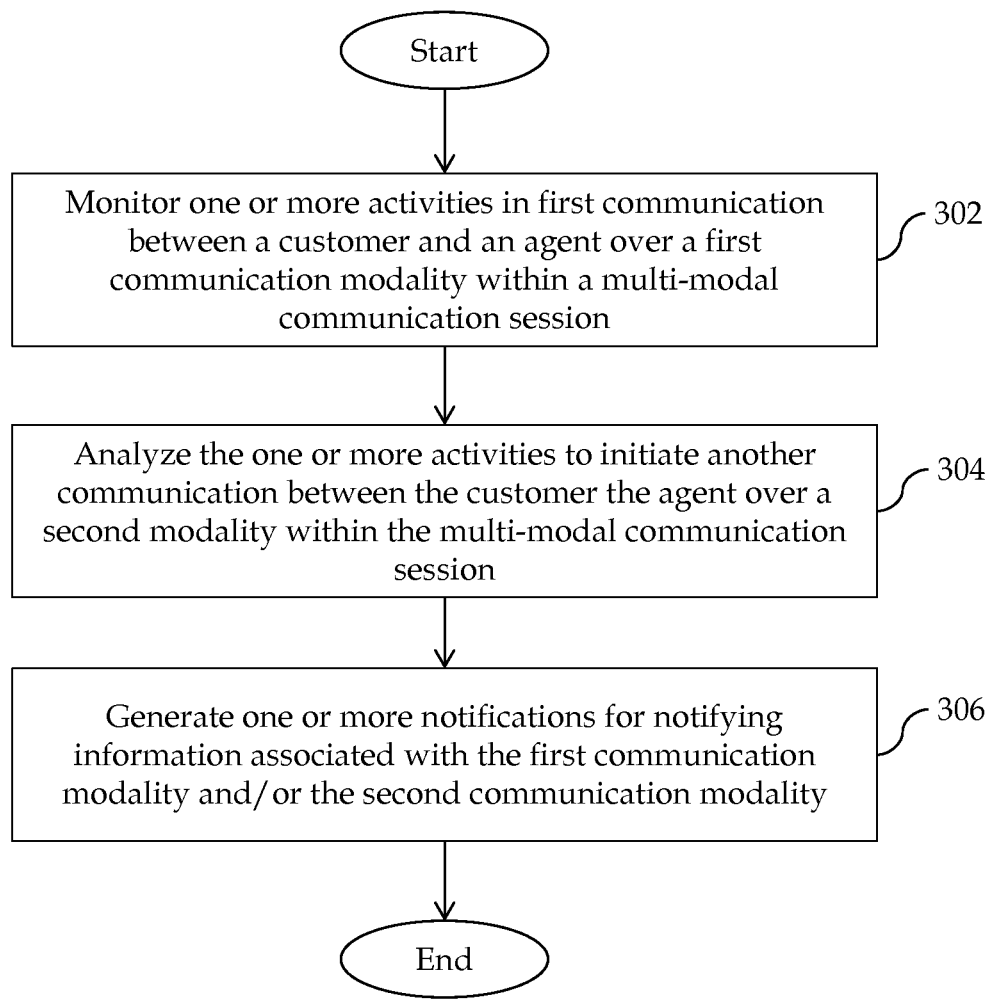
FIG. 3 depicts a flowchart of a method for managing a multi-modal communication session in the contact center, according to an embodiment of the present invention.

FIG. 3 depicts a flowchart of a method 300 for managing a multi-modal communication session in the contact center 100, according to an embodiment of the present invention.

At step 302, the computing system 228 monitors the multi-modal communication session between a customer and an agent of the contact center 100. The computing system 228 monitors a communication modality of the communication session between the agent and the customer. The communication modality may include, but are not restricted to, a voice communication modality, a video communication modality, a textual communication modality, an Interactive Voice Response (IVR) communication modality, a Voice over Internet Protocol (VoIP) communication modality, a Web Real Time Communication (WebRTC) communication modality, and so forth. Further, the computing system 228 monitors the communication between the customer and the agent over a first communication modality of the communication session to determine context of the communication session. In an embodiment of the present invention, the context of the communication session is determined by monitoring inputs selected by the customer in an IVR menu of the contact center 100. In an exemplary scenario, a customer is communicating with an agent over a web chat and after five minutes the customer desires to communicate with the agent over a voice call. The communication over the second communication modality operates along with the communication over the first communication modality. Further, the customer may desire to communicate with the agent over a video call then the agent may initiate a video call between the customer and the agent over a third communication modality within the multi-modal communication session.

Also, the computing system 228 monitors one or more activities associated with the communication session. The activities may include, but are not restricted to, ringing of the agent's telephone, pressing a button to answer a communication, display of a web chat window, accepting a request to initiate a web chat, and the like. The computing system 228 monitors the activities to determine whether to initiate another communication between the customer and the agent over a second communication modality along with the first communication modality.

At step 304, the computing system 228 analyzes the activities associated with the communication session between the customer and the agent of the contact center 100. The computing system 228 analyzes the activities to initiate another communication between the customer and the agent over a second communication modality within the multi-modal communication session. In an exemplary scenario, a customer is communicating with an agent over a voice call and after three minutes the customer desires to communicate with the agent over a video call, then the agent initiates an outbound video call to the customer's device by using a Computer Telephony Integration (CTI). In an embodiment, the communication over the second communication modality operates along with the communication over the first communication modality.

Further, at step 306, the computing system 228 generates notifications for a supervisor monitoring the communication session between the customer and the agent, in an embodiment of the present invention. The notifications may include information associated with the first communication modality, the second communication modality, or a combination thereof to the supervisor, in an embodiment of the present invention. The information may include, but not restricted to, a communication modality over which the communication is taking place, a change in communication modality between the customer and the agent, a status of the communication session, and the like.

Further, the computing system 228 presents the notifications to the supervisor, in an embodiment of the present invention. The computing system 228 presents the notification as, but not restricted to, an SMS, a web chat, an Instant Messaging (IM), an audio notification, a video notification, an email, and the like, in an embodiment of the present invention.

Figure 4A:
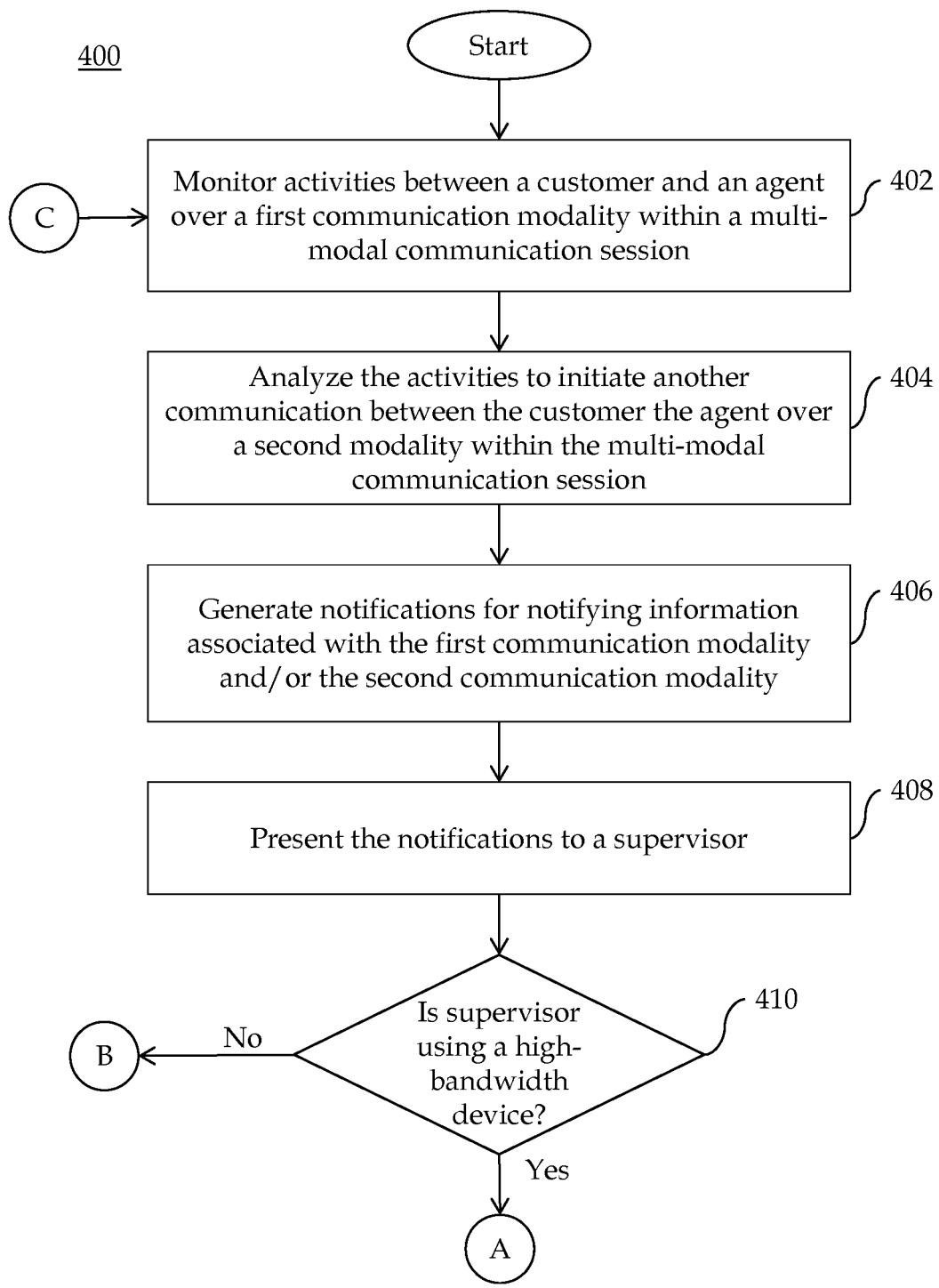
FIGS. 4A and 4B depict a flowchart of a method for managing a multi-modal communication session in the contact center, according to another embodiment of the present invention.
Figure 4B:
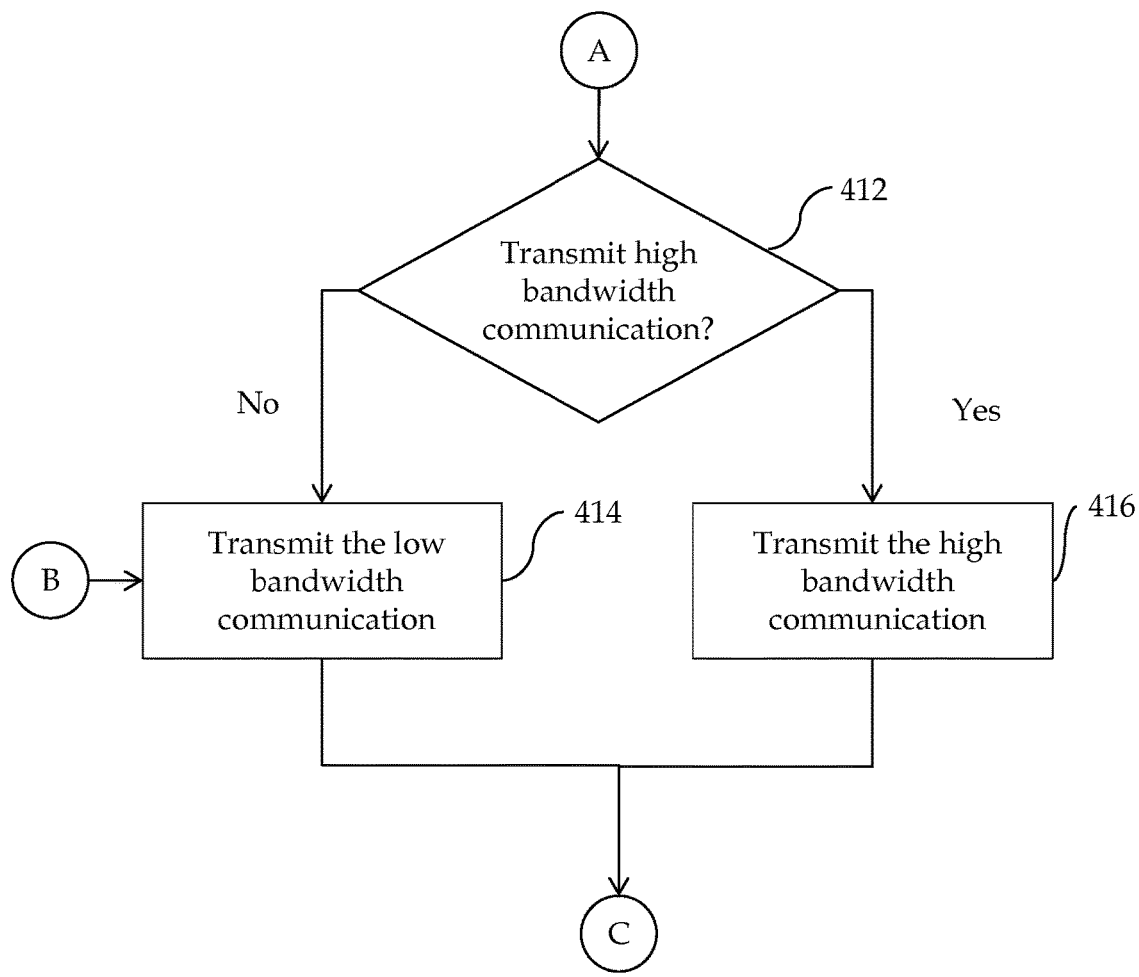

FIGS. 4A and 4B depict a flowchart of a method 400 for managing a multi-modal communication session in the contact center 100, according to another embodiment of the present invention. At step 402, the computing system 228 monitors the multi-modal communication session between a customer and an agent of the contact center 100. The computing system 228 monitors a communication modality of the communication session between the agent and the customer, in an embodiment of the present invention. The communication modality may include, but are not restricted to, a voice communication modality, a video communication modality, a textual communication modality, an Interactive Voice Response (IVR) communication modality, a Voice over Internet Protocol (VoIP) communication modality, a Web Real Time Communication (WebRTC) communication modality, and so forth. Also, the computing system 228 monitors one or more activities associated with the communication session. The activities may include, but are not restricted to, ringing of the agent's telephone, pressing a button to answer a communication, display of a web chat window, accepting a request to initiate a web chat, and the like. The computing system 228 monitors the activities to determine whether to initiate another communication between the customer and the agent over a second communication modality along with the first communication modality.

At step 404, the computing system 228 analyzes the activities associated with the communication session between the customer and the agent of the contact center 100. The computing system 228 analyzes the activities to initiate another communication between the customer and the agent over a second communication modality within the multi-modal communication session. In an exemplary scenario, a customer is communicating with an agent over a voice call and after two minutes the customer desires to communicate with the agent over a video call, then the agent initiates an outbound video call to the customer's device. In an embodiment, the communication over the second communication modality operates along with the communication over the first communication modality.

Further, at step 406, the computing system 228 generates notifications for a supervisor monitoring the communication session between the customer and the agent. The notifications may include, but not restricted to, information associated with the first communication modality, the second communication modality, or a combination thereof to the supervisor, in an embodiment of the present invention. The information may include, but not restricted to, a communication modality over which the communication is taking place, a change in communication modality between the customer and the agent, a status of the communication session, and the like. At step 408, the computing system 228 presents the notifications to the supervisor, in an embodiment of the present invention. The computing system 228 presents the notification as, but not restricted to, an SMS, a web chat, an Instant Messaging (IM), an audio notification, a video notification, an email, and the like, in an embodiment of the present invention.

At step 410, the computing system 228 determines whether the supervisor is using a high bandwidth device. If it is determined that the supervisor is using a high bandwidth device then the method 400 proceeds towards step 412. If it is determined that the supervisor is not using a high bandwidth device then the method 400 proceeds towards step 414.

Further, at step 412, the computing system 228 determines whether to transmit the high bandwidth communication. If it is determined that the high bandwidth communication is not to be transmitted then the method 400 proceeds towards step 414. If it is determined that the high bandwidth communication is to be transmitted then the method 400 proceeds towards step 416.

At step 414, only low bandwidth communications are transmitted to the supervisor's device. Next, at the step 416, the computing system 228 transmits the high bandwidth communication of the communication session to the supervisor's device. The computing system 228 transmits the communication to the supervisor through a communication network, such as network 162 and/or network 150. In an embodiment of the present invention, the communication may be recorded and stored in database. Further, the communication session may be terminated or routed to another agent based on a context of the communication, in an embodiment of the present invention.

Subsequently, the process proceeds towards step 402, where the multi-modal communication may be monitored for activities in the communication session. In an embodiment of the present invention, the process concludes when the communication session between the agent and the customer is closed.

In an exemplary scenario, an inbound web chat session is managed by an agent of the contact center 100 and a supervisor of the contact center 100 begins to observe communication between the customer and the agent by transmitting a command from a work station. Further, the customer desires to communicate with the agent over a voice call then the agent initiates an outbound voice call to the customer's telephone. The added communication modality (i.e., the voice call) is determined and a notification about the added communication modality is transmitted to the supervisor. Further, the customer initiates a web browser session with the agent and the supervisor is notified about the third communication modality and is automatically added to the web browser session as the supervisor is observing the communication between the agent and the customer. Furthermore, the customer desires to add a video to their discussion then the agent sends a network link such as a Uniform Resource Locator (URL), via the web chat that allows the customer to create an inbound WebRTC video call. Again, the supervisor is notified about the WebRTC video call between the customer and the agent by automatically providing the WebRTC call to a browser of the device associated with the supervisor, and the supervisor may now observe the another communication over a new communication modality of the communication session between the customer and the agent. Therefore, the supervisor is notified about the new communication modalities of the communication session.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

It will be appreciated from the preceding description, and for reasons of computation efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computing system for managing a multi-modal communication session in an enterprise, the system comprising:
   a memory device storing executable instructions;
   a processor in communication with the memory device, wherein executing the executable instructions by the processor causes the processor to:
      monitor one or more activities associated with the multi-modal communication session between a customer and an agent, wherein the customer and the agent communicate over a first communication modality;

analyze the one or more activities to initiate communication between the customer and the agent over a second communication modality within the multi-modal communication session, wherein the communication over the second communication modality operates along with the communication over the first communication modality;

generate one or more notifications for notifying information associated with the first communication modality, the second communication modality, or a combination thereof, to a supervisor monitoring the multi-modal communication session;

determine a bandwidth capability of a device associated with the supervisor; and transmit the one or more notifications to the device associated with the supervisor at one of a plurality of selectable bandwidths, based on the determined bandwidth capability of the device.

2. The system of claim 1, wherein executing the executable instructions by the processor causes the processor to: enable the supervisor to join the multi-modal communication session.

3. The system of claim 2, wherein executing the executable instructions by the processor causes the processor to receive a request from the supervisor to join the multi-modal communication session.

4. The system of claim 2, wherein the supervisor joins the multi-modal communication session based on bandwidth of the first communication modality, the second communication modality, or a combination thereof.

5. The system of claim 2, wherein executing the executable instructions by the processor causes the processor to provide additional information associated with the multi-modal communication session to at least one of the agent and the supervisor.

6. The system of claim 1, wherein the first communication modality and the second communication modality comprise at least one of a text communication modality, an audio communication modality, a video communication modality, or a web chat communication modality.

7. The system of claim 1, wherein the multi-modal communication session is a Web Real time Communication (WebRTC) communication session.

8. The system of claim 1, wherein a plurality of multi-modal communication sessions are monitored by the supervisor, wherein a plurality of notifications associated with the multi-modal communication sessions are presented to the supervisor.

9. The system of claim 1, wherein the one or more notifications include information associated with a plurality of multi-modal communication sessions between one or more customers and one or more agents.

10. A computer-implemented method for managing a multi-modal communication session, the method comprising:

monitoring, by a server of a contact center, one or more activities associated with the multi-modal communication session between a customer and an agent, wherein the customer and the agent communicate over a first communication modality;

analyzing, by the server of the contact center, the one or more activities to initiate communication between the customer and the agent over a second communication modality within the multi-modal communication session, wherein the communication over the second communication modality operates along with the communication over the first communication modality;

generating, by the server of the contact center, one or more notifications for notifying information associated with the first communication modality, the second communication modality, or a combination thereof, to a supervisor;

determining, by the server of the contact center, a bandwidth capability of a device associated with the supervisor monitoring the multi-modal communication session; and transmitting the one or more notifications to the device associated with the supervisor at one of a plurality of selectable bandwidths, based on the determined bandwidth capability of the device.

11. The method of claim 10, further comprising:
enabling the supervisor to join the multi-modal communication session.

12. The method of claim 11, further comprising:
receiving a request from the supervisor to join the multi-modal communication session.

13. The method of claim 11, wherein the supervisor joins the multi-modal communication session based on bandwidth of the first communication modality, the second communication modality, or a combination thereof.

14. The method of claim 10, further comprising:
providing additional information associated with the multi-modal communication session to at least one of the agent and the supervisor.

15. The method of claim 10, wherein the first communication modality and the second communication modality comprise at least one of a text communication modality, an audio communication modality, a video communication modality, and a web chat communication modality.

16. The method of claim 10, wherein a plurality of multi-modal communication sessions are monitored by the supervisor, wherein a plurality of notifications associated with the multi-modal communication sessions are presented to the supervisor.

17. The method of claim 10, wherein the one or more notifications include information associated with a plurality of multi-modal communication sessions between one or more customers and one or more agents.

18. A computer-implemented method for managing a multi-modal communication session in an enterprise, the method comprising:

monitoring, by a server of a contact center, one or more activities associated with the multi-modal communication session between a customer and an agent, wherein the customer and the agent communicate over a first communication modality;

storing, by the server of the contact center, the one or more activities in at least one database;

analyzing, by the server of the contact center, the one or more activities to initiate communication between the customer and the agent over a second communication modality within the multi-modal communication session, wherein the communication over the second communication modality operates along with the communication over the first communication modality;

generating, by the server of the contact center, one or more notifications for notifying information associated with the first communication modality, the second communication modality, or a combination thereof, to a supervisor monitoring the multi-modal communication session;

determining, by the server of the contact center, a bandwidth capability of a device associated with the supervisor monitoring the multi-modal communication session;

transmitting the one or more notifications to the device associated with the supervisor at one of a plurality of selectable bandwidths, based on the determined bandwidth capability of the device;

receiving, by the server of the contact center, a request from the supervisor to join the multi-modal communication session; and enabling, by the server of the contact center, the supervisor to join the multi-modal communication session.

19. The method of claim 18, further comprising:

providing additional information associated with the multi-modal communication session to at least one of the agent and the supervisor.

20. The method of claim 18, wherein the first communication modality and the second communication modality comprise at least one of a text communication modality, an audio communication modality, a video communication modality, or a web chat communication modality.

\* \* \* \* \*